UNITED STATES PATENT OFFICE 2,316,908

PHOSPHORIC ACID DERIVATIVES OF BACTERICIDAL COMPOUNDS AND MANUFACTURE THEREOF

Kurt Warnat, Basel, Switzerland, assignor to Hoffmann-La Roche Inc., Nutley, N. J., a corporation of New Jersey No Drawing. Application August 19, 1939, Serial No. 291,104. In Germany August 27, 1938

3 Claims. (Cl. 260—397.7)

Phosphoric acid dichlorides of 4-amino benzene sulphonamides of the general formula

in which R represents alkyl or hydrogen, R' alkyl, aryl, or hydrogen, and R'' alkyl or hydrogen, are obtained by heating the corresponding 4-amino benzene sulphonamides themselves or in form of their salts with phosphorus oxychloride. Phosphoric acid dichlorides of other compounds having a bactericidal action can also be obtained by heating either sulphurous, bactericidal compounds containing one or several amino groups or their salts with phosphorus oxychloride. The following starting materials may be used.

Derivatives of sulphanilic acid amide, such as p-amino benzene sulphonyl sulphanilamide and p-amino benzene sulphonyl sulphanilic acid dimethylamide. Derivatives of sulphanilic acid anilides having a bactericidal action, such as sulphanilic acid-4-nitroanilide.

It has now been found that on heating with sulphurous bactericidal amino compounds these phosphoric acid dichlorides are converted into phosphoric acid chlorides which on decomposition with water or aqueous bases form phosphoric acids having a bactericidal action which also form neutral salts soluble in water. Phosphoric acid derivatives can be prepared containing 2 bactericidal components which may be either identical or different. If the phosphoric acid contains 2 different components, medicinal preparations are obtained which are effective against different kinds of bacteria, for instance, streptococci and staphylococci, or streptococci and gonococci, or streptococci and pneumococci, etc.

Suitable sulphurous, bactericidal amino compounds are, for instance:

Sulphanilic acid amide, as well as its N-monoalkyl derivatives and its derivatives mono- or dialkylated at the sulphamido group. Derivatives of sulphanilic acid anilide, such as nitro- and sulphonamide compounds, as well as their corresponding alkyl derivatives, for instance, sulphanilic acid-4-nitroanilide, p-amino benzene sulphonyl sulphanilamide (sulphanilic acid-4-sulphonamidoanilide), p-amino benzene sulphonyl sulphanilic acid mono- or dimethylamide.

These amino compounds themselves may also be heated after addition of suitable tertiary bases, such as dimethylaniline, or in form of their salts with phosphoric acid dichlorides, whereby any combination is possible.

Water soluble derivatives of sulphanilamide and its derivatives have already become known (French patent specifications 815,502, 816,988; British patent specification 487,378; "Chemisches Zentralblatt" year 1937, II, page 1191, bottom, and 1192, top). But these compounds show various disadvantages. Thus, the compound capable of being prepared in accordance with Example 3 of British patent specification 487,378 is no longer effective against meningococci, whereas sulphanilamide is effective in cases of meningococcous infections (Whitby, "Lancet" year 1937, I, page 1518, table IV, and page 1519, right column, section [3]). The formaldehyde bisulphite derivatives of sulphanilic acid amides described in French patent specifications 815,502 and 816,988, Example 1, have lost part of their activity (Fischer, "Archives internationales de Pharmacodynamie et de Thérapie" 56, page 134, bottom 4). The derivatives of phenyl glycine which can be obtained in accordance with Examples 2 and 4 of French patent specification 816,988 are only very little active (Fischer, "Archives internationales de Pharmacodynamie et de Thérapie" 56, page 134, bottom 3). The glucose derivative of sulphanilamide ("Zentralblatt" year 1937, II, page 1191, bottom, and page 1192, top) does not form neutral salts, while the phosphoric acid derivatives preparable in accordance with the present process form neutral salts with suitable bases, such as hexamethylene tetramine, and alkaloids, whereby the action of such bases can be increased by the action of the sulphonamides employed.

Example 1

29 parts by weight of phosphoric acid dichloride-4-sulphonamidoanilide and 17 parts by weight of sulphanilamide are thoroughly mixed and heated while keeping away moisture. For a short time the mixture remains viscous and then becomes solid. The solidified reaction mixture is brought into an excess of caustic soda solution while cooling, filtered and treated with hydrochloric acid. The resulting phosphoric acid-di-4-sulphonamidoanilide of the formula PO(OH)(NHC$_6$H$_4$SO$_2$NH$_2$)$_2$ precipitates and can be purified further after sucking off by dissolving in alkali and reprecipitation. The compound forms easily soluble neutral salts.

Example 2

29 parts by weight of phosphoric acid dichloride-4-sulphonamidoanilide are well mixed with 21 parts by weight of sulphanilamide hydrochloride and for some time heated while excluding moisture. The solidified reaction product is brought into an excess of caustic soda solution while cooling. On acidification the compound described in Example 1 is obtained.

Example 3

29 parts by weight of phosphoric acid dichloride-4-sulphonamidoanilide are thoroughly mixed with 17 parts by weight of sulphanilamide and heated as described in Example 1. The reaction product is decomposed when brought into cold or warm soda solution. On acidification the phosphoric acid di-4-sulphonamidoanilide is obtained.

Example 4

29 parts by weight of phosphoric acid dichloride-4-sulphonamidoanilide are heated with 17 parts by weight of sulphanilamide. The solid mass is decomposed by water and the undissolved material sucked off. The product is dissolved in soda solution, filtered and the compound described in Example 1 precipitated by the addition of acid.

Example 5

29 parts by weight of phosphoric acid dichloride-4-sulphonamidoanilide are triturated with 17 parts by weight of sulphanilamide and the mixture heated after addition of 25 parts by weight of dimethylaniline. The reaction product solidifying on cooling is brought into an excess of cooled caustic soda solution and the separated dimethylaniline is removed by shaking with ether. The product is then treated with hydrochloric acid and the isolated phosphoric acid di-4-sulphonamidoanilide filtered off. It is dissolved in soda solution and after filtration acid is added. The compound described in Example 1 precipitates.

Example 6

10 parts by weight of p-amino benzene sulphonyl sulphanilic acid dimethylamide are boiled with 20 parts by weight of phosphorus oxychloride until solution sets in and the raw product is freed from surplus phosphorus oxychloride by heating in vacuo. The solid phosphoric acid dichloride is thoroughly mixed with 10 parts by weight of sulphanilamide and heated while excluding moisture. The resulting viscous product solidifies and is brought into an excess of alkali solution while cooling. On addition of acid the compound of the formula NH$_2$O$_2$SC$_6$H$_4$NHPO(OH)
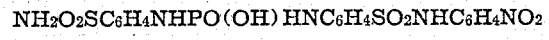
NHC$_6$H$_4$SO$_2$NHC$_6$H$_4$SO$_2$N(CH$_3$)$_2$ precipitates. It is purified by dissolving in dilute soda solution and reprecipitation by mineral acid. With alkalis the compound forms easily soluble neutral salts.

Example 7

The phosphoric acid dichloride obtained by heating 20 parts by weight of sulphanilic acid-4-nitroanilide with phosphorus oxychloride, is heated with 25 parts by weight of sulphanilamide. By decompostion of the reaction product with a cold solution of caustic soda an alkaline solution of the compound having the formula

NH$_2$O$_2$SC$_6$H$_4$NHPO(OH) HNC$_6$H$_4$SO$_2$NHC$_6$H$_4$NO$_2$ is obtained. On addition of a little acetic acid small quantities of unchanged sulphanilic acid-4-nitroanilide precipitate. By treatment with mineral acid the phosphatic acid compound is separated. For further purification the product is again dissolved in soda solution and reprecipitated. The compound formed is almost colourless; it dissolves in alkalis and ammonia yielding yellow solutions.

I claim:

1. The compound of the formula

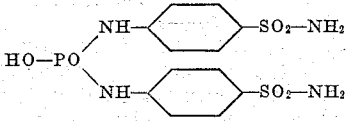

2. Process for the manufacture of a compound of the formula

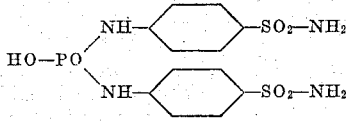

comprising reacting a compound of the formula

with sulphanilic acid amide and treating the reaction product formed with an aqueous solution of a base.

3. Compounds represented by the formula:

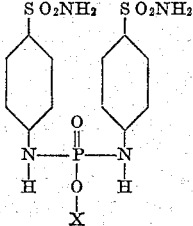

in which X is selected from a group consisting of hydrogen and the alkali metals.

KURT WARNAT.